No. 624,596. Patented May 9, 1899.
N. G. WILLIAMS.
CENTRIFUGAL CREAM SEPARATOR.
(Application filed June 15, 1897.)
(No Model.) 2 Sheets—Sheet 1.

Witnesses
Harry S. Nushafer
C. E. Buckland

Inventor
Nathan G. Williams
By W. E. Simonds
Atty

No. 624,596. Patented May 9, 1899.
N. G. WILLIAMS.
CENTRIFUGAL CREAM SEPARATOR.
(Application filed June 15, 1897.)
(No Model.) 2 Sheets—Sheet 2.

Witnesses.

Inventor.
Nathan G. Williams
By W. S. Simonds
Atty

UNITED STATES PATENT OFFICE.

NATHAN G. WILLIAMS, OF BELLOWS FALLS, VERMONT.

CENTRIFUGAL CREAM-SEPARATOR.

SPECIFICATION forming part of Letters Patent No. 624,596, dated May 9, 1899.

Application filed June 15, 1897. Serial No. 640,840½. (No model.)

*To all whom it may concern:*

Be it known that I, NATHAN G. WILLIAMS, a citizen of the United States of America, residing at Bellows Falls, in the county of Windham and State of Vermont, have invented a certain new and useful Improvement in Centrifugal Separators, of which the following is a description, reference being had to the accompanying drawings, wherein—

Figure 1:
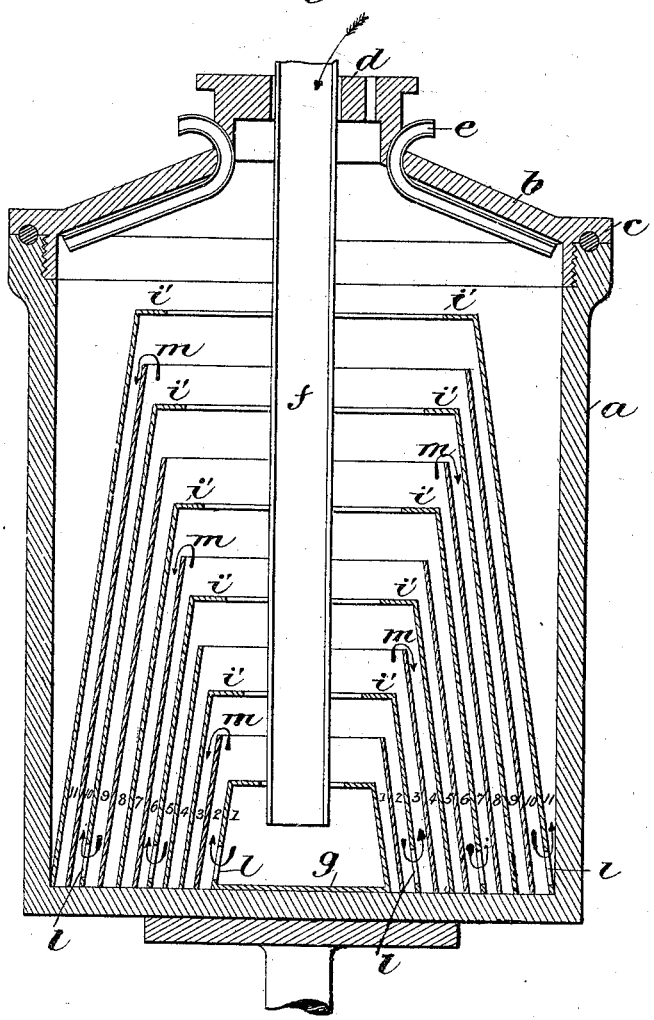
Figure 2:
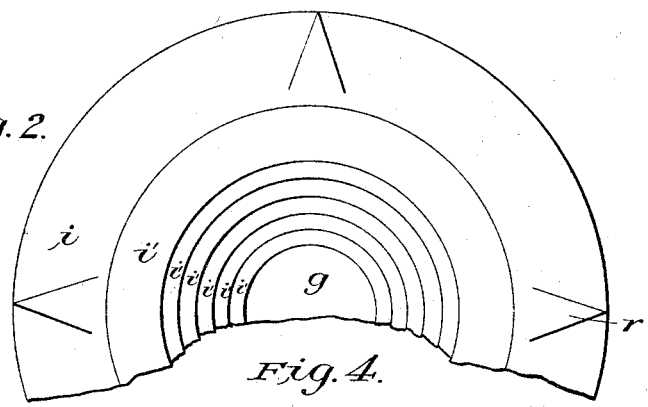
Figure 4:
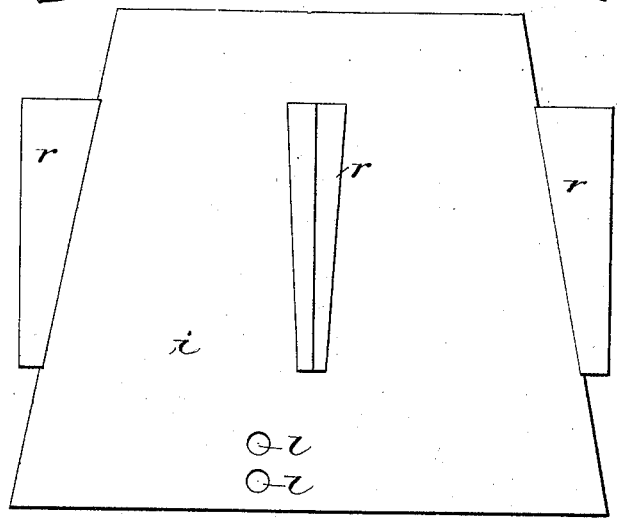
Figure 3:
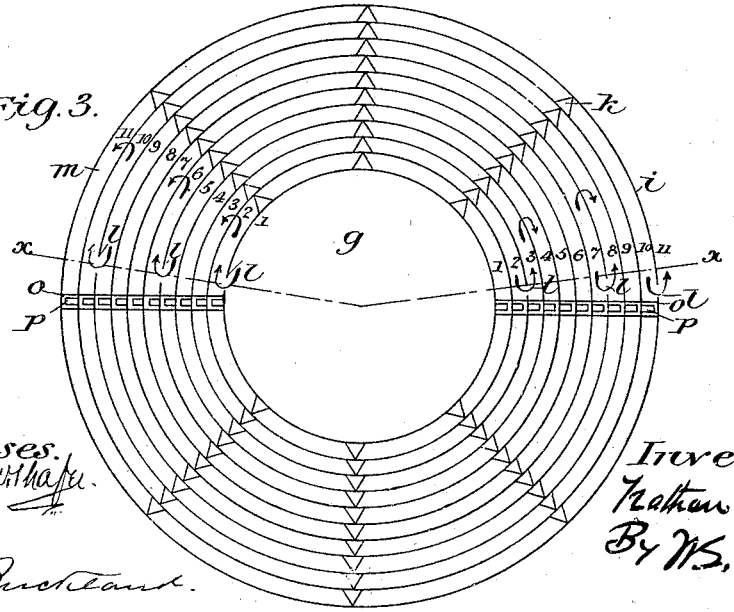

Figure 1 is a view in vertical section on the plane denoted by the dotted line $xx$. Fig. 2 is a top view, on a larger scale than Fig. 1, of the nest of partitions contained within the drum. Fig. 3 is a bottom view of the parts shown in Fig. 2. Fig. 4 is a side or elevation view of the parts shown in Fig. 2.

The apparatus shown and described herein is applicable to the separation of intermixed liquids of different densities generally, but will be herein described as applied to the separation of cream from whole milk.

The letter $a$ denotes the swiftly-rotating drum; $b$, the cover screwing upon the same; $c$, the rubber packing at the joint between the two; $d$, the cream-outlet; $e$, the blue-milk outlets, and $f$ the feed-pipe, where the whole milk enters.

The letters $i$ denote partitions which are annular or substantially annular in form, one within the other and substantially concentric in relation to each other. The innermost of these partitions has a floor $g$. These partitions are separable one from the other and can all be taken out of the drum. They are kept apart by spacing projections $k$, located at numerous suitable points upon the outer surface of each of the annular partitions.

The partitions $i$ increase in length successively one after the other from the center outwardly, and every other or alternate partition has an end flange $i'$.

The letters $o$ denote grooved ways on the inner surface of each of the partitions, and the letters $p$ denote corresponding ridges on the outer surface of the partitions, sliding in and coöperating with the grooved ways, and together the ridges and the grooves form dams or stops, which prevent the milk in any one of the annular chambers formed by the partitions from circulating entirely around the whole of that chamber, and preferably each dam is located next a series of flow-passages.

The letters $r$ denote braces or stays on the exterior of the outermost annular partition.

The whole milk enters through the feed-pipe $f$ and escapes therefrom, near the bottom of the drum, within the smallest of the partitions. The latter under centrifugal force tend to move radially outward, thereby forcing the cream toward the center. The blue milk, carrying with it more or less of the unseparated cream-globules, passes through the series of flow-passages $l$, at or near the bottom of the partition, into the annular chamber, which is between the smallest of the annular partitions and the one next contiguous. Here the blue milk, as before, tends to the outside of this annular chamber, forcing the cream radially inward, and the cream, rising, finds escape at the top of this annular chamber into the central space, which is filled with cream. From the annular chamber last mentioned the blue milk escapes into the next of the annular chambers through the flow-passages $m$ at the upper end of the partition. Here the milk enters another of the annular chambers and further separation of the cream from the blue milk goes on, the cream rising and escaping to join the central mass of cream and the blue milk passing into the next of the annular chambers through the flow-passages $l$, and thus the process goes on in one annular chamber after another, the cream rising and moving inward to join the cream mass at the center and the blue milk passing from one annular chamber to another through flow-passages which are at alternately opposite ends of the partitions. Finally, the blue milk reaches the inner wall of the drum and escapes from the drum through the blue-milk outlets $e$, and if there be any cream separated in this final large chamber it rises, moves inward, and joins the central mass. The feed of the milk through the feed-pipe $f$ is so regulated that the quantity fed is somewhat less than can readily escape through the flow-passages $l$ of the innermost partition, to the end that all of the milk may pass through these flow-passages last mentioned.

The foregoing description of the course of the milk applies to one (vertical) half of the nest of annular partitions, they being divided into two equal parts by the ways $o$ and ridges $o'$. The course in the other half is just the same.

I claim as my improvement—

1. In a centrifugal separator, a plurality of annular partitions, substantially concentric with each other and with the center of the drum, forming annular spaces between them, the said partitions increasing in height successively from the center outward, being provided with vertical interlocking ridges and grooves forming dams or stops to prevent the fluid from circulating entirely around the annular spaces, and having apertures near the bottom in each alternate partition on both halves from the innermost one outward, forming passages for the fluid into each alternate semi-annular space successively said apertures being non-contiguous and a free passage being left at the tops of the annular spaces, all substantially as described and for the purposes specified.

2. In a centrifugal separator, a plurality of slightly-conical partitions, substantially concentric with each other and with the center of the drum, forming annular spaces between them, the said partitions increasing in height successively from the center outward, being provided with interlocking ridges and grooves forming dams or stops to prevent the fluid from circulating entirely around the annular spaces, having inturned flanges at the top of each alternate partition from the innermost one outward, and having also apertures near the bottom in each of the said alternate partitions on both halves forming passages for the fluid into each alternate semi-annular space successively, said apertures being non-contiguous, and a free passage being left at the top of the annular spaces, all substantially as described and for the purpose set forth.

NATHAN G. WILLIAMS.

Witnesses:
FRANK G. DAY,
M. A. NEWELL.